(12) United States Patent
Jin et al.

(10) Patent No.: US 7,735,432 B2
(45) Date of Patent: Jun. 15, 2010

(54) VEHICLE MOUNTED DISPLAY ELEVATING DEVICE

(75) Inventors: Philip Jin, Shenzhen (CN); Vicky Chen, Shenzhen (CN); Yucong Zou, Shenzhen (CN)

(73) Assignee: Shenzhen Roadmate Technology Co., Ltd., Shenzhen (CN)

( * ) Notice: Subject to any disclaimer, the term of this patent is extended or adjusted under 35 U.S.C. 154(b) by 412 days.

(21) Appl. No.: 11/842,269

(22) Filed: Aug. 21, 2007

(65) Prior Publication Data

US 2009/0008344 A1    Jan. 8, 2009

(30) Foreign Application Priority Data

Jul. 6, 2007    (CN)   .......................... 2007 1 0137720

(51) Int. Cl.
   *A47B 9/00*   (2006.01)
(52) U.S. Cl. .................... 108/147; 248/161; 248/188.4; 348/837; 296/70; 312/7.2; 312/319.5
(58) Field of Classification Search ................. 248/161, 248/188.4; 211/1.53; 348/837; 296/70; 108/147; 312/7.2, 319.5, 319.7–319.8
   See application file for complete search history.

(56) References Cited

U.S. PATENT DOCUMENTS

| | | | | |
|---|---|---|---|---|
| 97,489 A | * | 12/1869 | Edson | .......................... 187/267 |
| 736,431 A | * | 8/1903 | Opitz | .......................... 434/419 |
| 2,805,906 A | * | 9/1957 | Humphries et al. | ......... 108/129 |
| 3,610,562 A | * | 10/1971 | Holmes et al. | ........... 248/286.1 |
| 6,494,150 B1 | * | 12/2002 | Phoenix et al. | ............. 108/147 |
| 7,044,423 B2 | * | 5/2006 | Bober et al. | ............. 248/188.4 |
| 7,407,239 B2 | * | 8/2008 | Kunz | .......................... 312/312 |
| 2005/0275323 A1 | * | 12/2005 | Wilhelm | .................. 312/319.5 |
| 2008/0230671 A1 | * | 9/2008 | Xing | .......................... 248/425 |
| 2009/0057501 A1 | * | 3/2009 | Huang | ........................ 248/157 |
| 2009/0109352 A1 | * | 4/2009 | Lewis et al. | ................. 348/837 |

* cited by examiner

*Primary Examiner*—J. Allen Shriver, II
*Assistant Examiner*—Alaeddin Mohseni
(74) *Attorney, Agent, or Firm*—Marshall, Gerstein & Borun LLP

(57) ABSTRACT

A vehicle-mounted display elevating device comprising a display rack for mounting a display, and being provided with a threaded structure; a screw rod, engaging with the threaded structure; a gear transmission pair for coupling the output shaft of a motor with the screw rod; a guide bar carrier, one end of which is connected to the base support, and on which lower guide bars are provided; upper guide bars located in the display rack; and a stop block, on which are provided with lower guide holes and upper guide holes, and stoppers. The vehicle-mounted display elevating device is provided with anti-clamping and self-protection functions, and can be fixed inside an instrument panel, thus reducing the possibility that the display is damaged due to long time exposure.

17 Claims, 8 Drawing Sheets

VEHICLE MOUNTED DISPLAY ELEVATING DEVICE

STATEMENT OF RELATED APPLICATION

The present application claims the priority of the Chinese Patent Application No. 200710137720, entitled "A Vehicle-Mounted Display Elevating Device" which was filed on Jul. 6, 2007 and is incorporated herein by reference.

FIELD OF THE INVENTION

The present invention relates to a vehicle-mounted display elevating device, and, in particularly, to an automobile electronic display elevating device with an anti-clamping function.

BACKGROUND OF THE INVENTION

With the development of the automotive technologies, a well-developed vehicle-mounted display system may help a driver to know about the state of the automobile itself and the information relating to the driving around the automobile. To this end, various display technologies are being applied to automobiles. As a key part in the vehicle-mounted display system, special importance should be attached to the reasonableness of the design and installation of the central display.

Currently, displays are mostly fixed on instrument panels or fixed on sun-shields in the vehicle-mounted display systems of automobiles. Elevation of the display is realized by simply pressing a button. However, installation of the display on the sun-shield poses a challenge to the operations because the angle of view either deviates to the left or to the right. For this reason, we tend to mount the display on the instrument panel of the automobile. However, the display needs a larger space in this case, which is undesirable since more and more automobile electronic elements have to fight for the limited space. Furthermore, the current display elevating devices are not provided with anti-clamping or self-protection functions. If the driver is not aware that a passenger puts his hand or something into the base component of the central display on the instrument panel, it is likely that the passenger get injured by the descending display. In addition, the display is lack of protection due to long time exposure. If the display happens to be blocked and can not be fully drawn back, the motor used to drive the display will not stop running, thus the display elevating device will not shut down and be powered off for self-protection. For the sake of safety, it is required that, when the display is blocked by a large object thereunder in the process of moving downward, it can start to move upward automatically, or it stops immediately after it is blocked, so that no damages will happen to the display or the object.

SUMMARY OF THE INVENTION

To overcome the disadvantages with the existing vehicle-mounted display elevating devices, it is an object of the present invention to provide a new vehicle-mounted display elevating device that not only operates reliably, and is electronically controllable, but also has anti-clamping and self-protection functions, and has a simple structure and low cost. To achieve this object, the following technical solutions are employed.

The vehicle-mounted display elevating device according to one embodiment of the present invention comprises a display rack for mounting a display and being provided with a threaded structure; a screw rod, being engaged with the threaded structure on the display rack, and one end of which is located in a bearing disposed on a base support; a gear transmission pair for coupling the output shaft of a motor with a screw rod; a guide bar carrier, one end of which is fixed to the base support, and on which is provided with a lower guide bar; an upper guide bar located in the display rack; and a stop block, on which are provided with a lower guide hole and an upper guide hole that match with the lower guide bar and the upper guide bar respectively, thus enabling it to move along the lower guide bar and the upper guide bar; and the stop block further provided with a stopper that works in cooperation with the fixing lug on the guide bar carrier to limit the stop block and in turn limit the elevating position for the display rack.

The vehicle-mounted display elevating device according to one embodiment of the present invention further comprises a position sensor for sensing a predetermined highest position and a predetermined lowest position to which the display rack is allowed to move, and a control module for controlling the motor to stop rotating in response to the sensing result of the position sensor. Preferably, the position sensor comprises a reflecting plate on the display rack and two reflective photoelectric sensors. The positions where the reflecting plate respectively meets these two reflective photoelectric sensors are defined as the predetermined highest position and the lowest position to which the display rack is allowed to move. The reflecting plate is provided at the lower part of the display rack, and the two reflective photoelectric sensors are respectively provided at the lower and upper parts on one side of the guide bar carrier, facing the display rack. The control module is further configured to control the motor to stop rotating when the position sensor fails to detect any change in the position of the display rack in a predetermined time period in the ascending or descending process of the display.

Preferably, the threaded structure is a threaded member that is fixed on the display rack. The stopper on the stop block are a step arranged on the stop block, and the fixing lug on the guide bar carrier is a lower guide bar fixing lug arranged on the top of the guide bar carrier.

Also preferably, the at least one lower guide bar is configured as a pair of parallel bars; the at least one upper guide bar is also configured as a pair of parallel bars; and both the at least one lower hole and the at least one upper guide hole provided on the stop block are correspondingly configured as a pair of parallel holes respectively. The two upper guide bars are arranged between the two lower guide bars, and the screw rod is arranged between the two upper guide bars and the two lower guide bars.

More preferably, the stop block is narrow in the upper part and wide in the lower part; the upper guide holes are respectively located at both sides of the upper part, and the lower guide holes are respectively located at both sides of the lower part; and a step is formed as the stopper where the upper part joins with the lower part. The stop block, located between the guide bar carrier and the display rack, connects the display rack with the guide bar carrier. The upper guide bar is located at one side of the display rack opposite to that on which the display is mounted. The stop block works in cooperation with the upper guide bar fixing lug provided on the display rack to limit the position to which the display rack is allowed to move down.

The gear transmission pair includes a skew gear engaged with a runner on the motor output shaft, a disk gear engaged with the skew gear, and a screw gear fixed on the screw rod and engaged with the disk gear.

Alternatively, the screw rod and threaded member mechanism may be replaced by a gear rack and gear mechanism or a belt and belt roller mechanism.

The advantageous effect achieved by the present invention is that since there is provided a screw rod and threaded member mechanism or a gear rack and gear reciprocating motion mechanism, the elevating motion of the display is achieved. By providing a reflecting plate on the display rack and providing a module for sensing the moving position of the reflecting plate on the control module, when the display elevating device detects any blocking objects on the base support, it will automatically stop the display from moving up and down, thereby implementing the anti-clamping and self-protection functions of the display. Since the base support is configurable in the instrument panel, the profile of the display well matches with the entire instrument panel of the vehicle, presenting a fashionable and esthetic look. While in use, the display can move up slowly from the instrument panel. In this way, it is less likely that the display will be damaged due to long time exposure. The vehicle-mounted display elevating device can be easily practiced thanks to a simple structure and low cost.

The present invention will be further described below with reference to the accompanying drawings and embodiments.

DETAILED DESCRIPTION OF THE INVENTION

Figure 1:
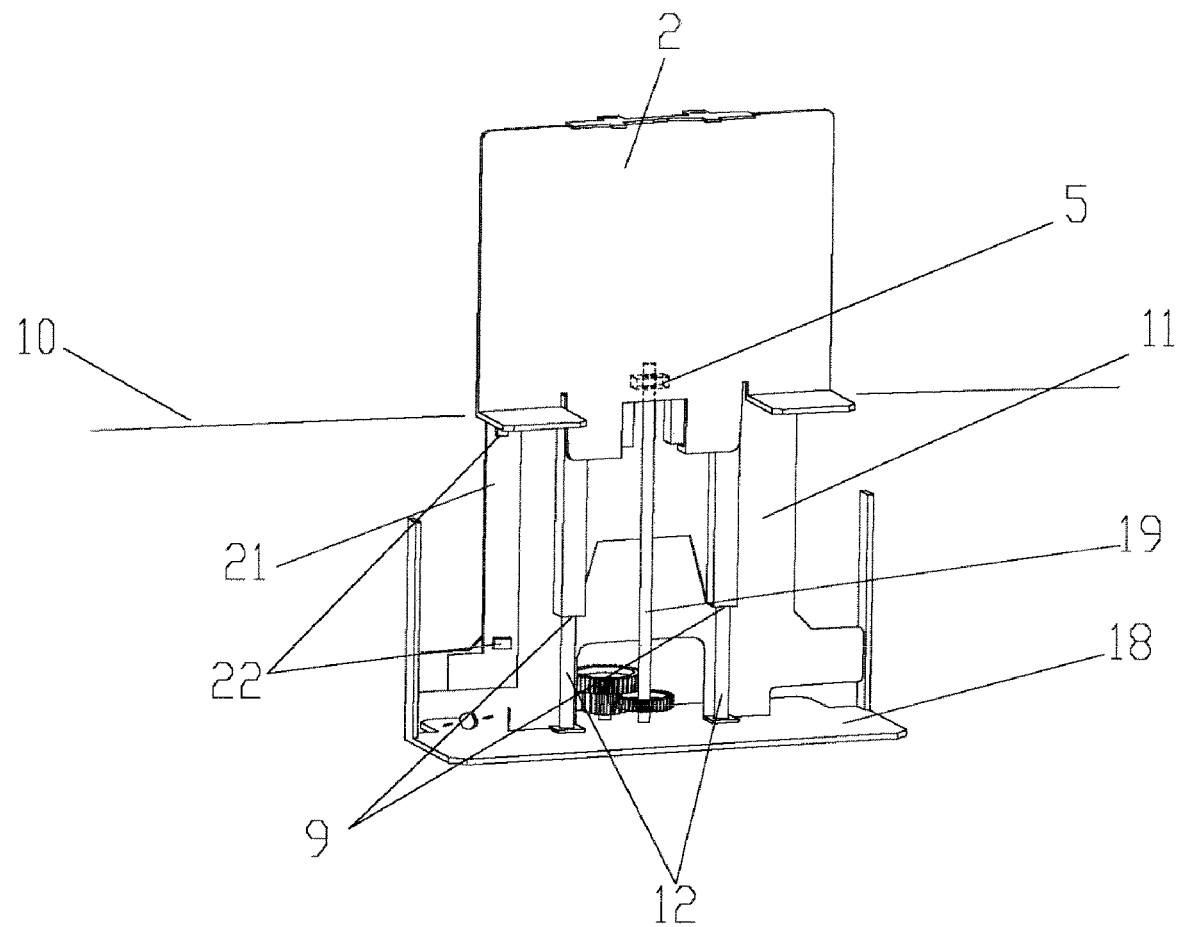
FIG. 1 is a schematic structural diagram of the vehicle-mounted display elevating device according to an embodiment of the present invention.
Figure 2:
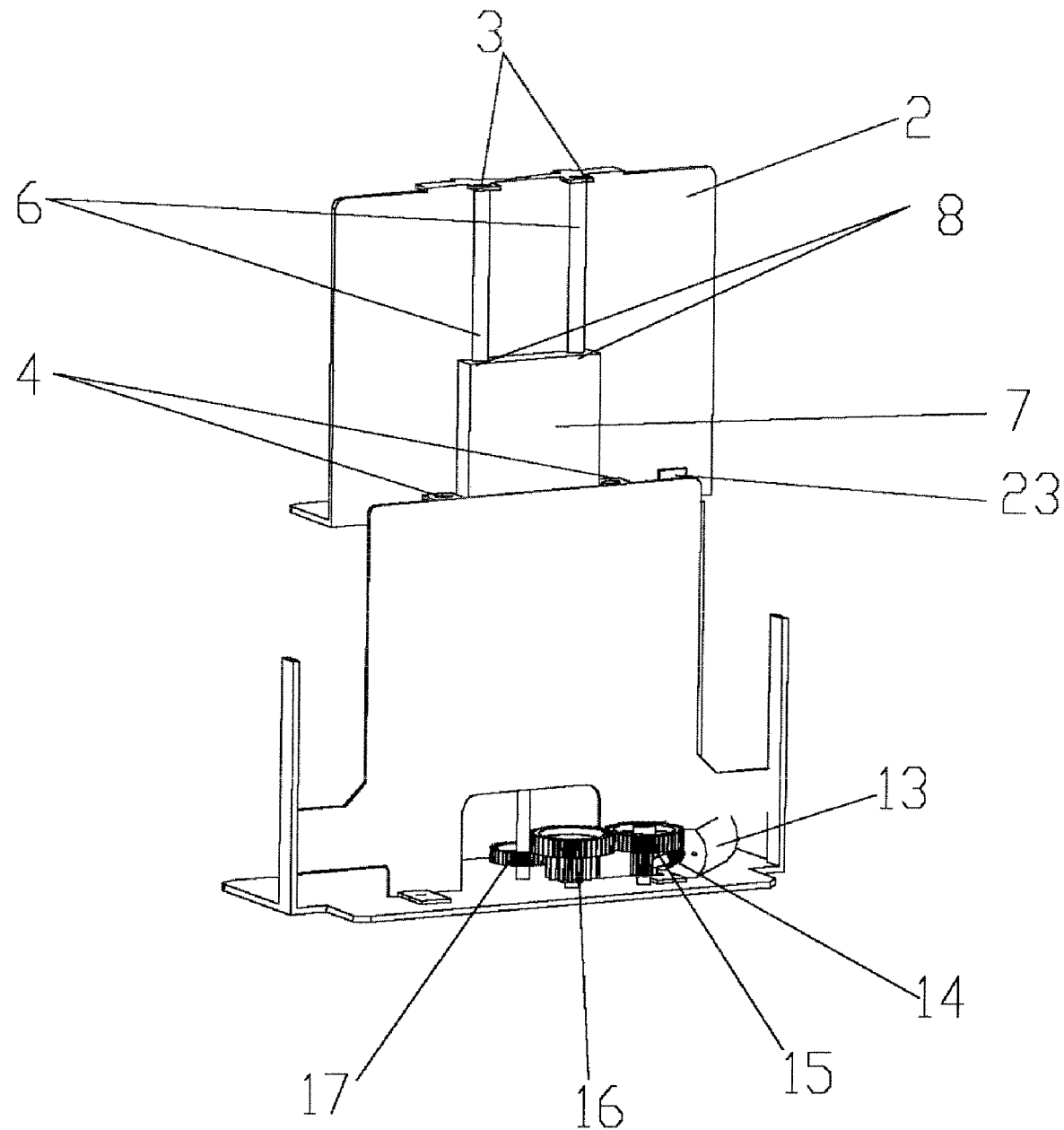
FIG. 2 is a schematic structural diagram of the vehicle-mounted display elevating device according to an embodiment of the present invention when viewed from another direction.
Figure 3:
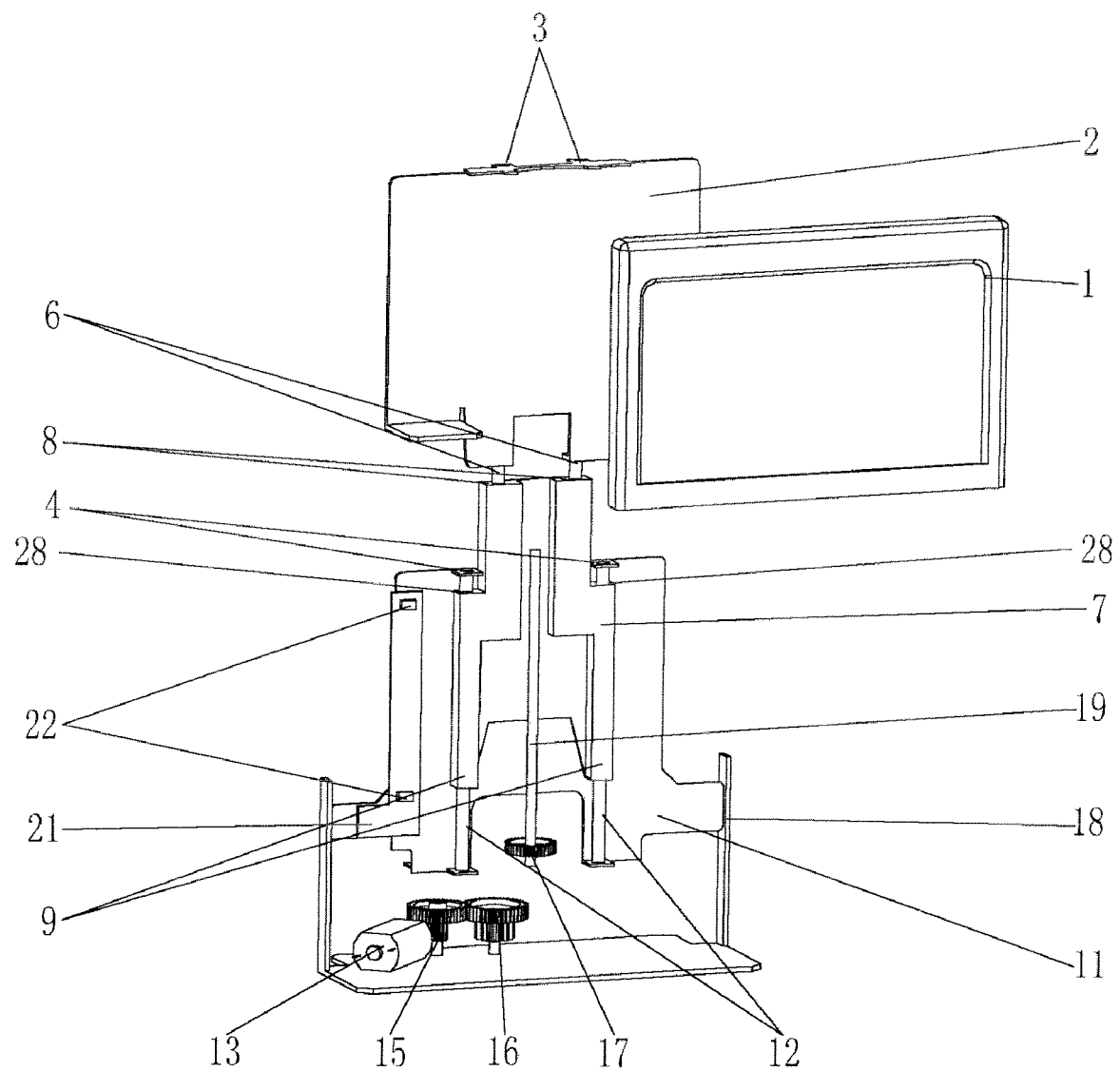
FIG. 3 is an exploded structural diagram of the vehicle-mounted display elevating device according to an embodiment of the present invention.

FIG. 1 and FIG. 2 show the structure of the display elevating device according to one embodiment of the present invention, including a base support 18 installed in an instrument panel 10, a display rack 2 for mounting the display 1, a stop block 7 and a guide support 11. The display 1 may be fixed on the display rack 2, as indicated in FIG. 3. In this embodiment, upper guide bars 6 and lower guide bars 12 are preferably arranged as a pair of parallel bars respectively. The upper guide bars 6 is located on one side of the display rack 2, opposite to the display 1, and the lower guide bars 12 are located on the guide bar carrier 11.

Figure 4:
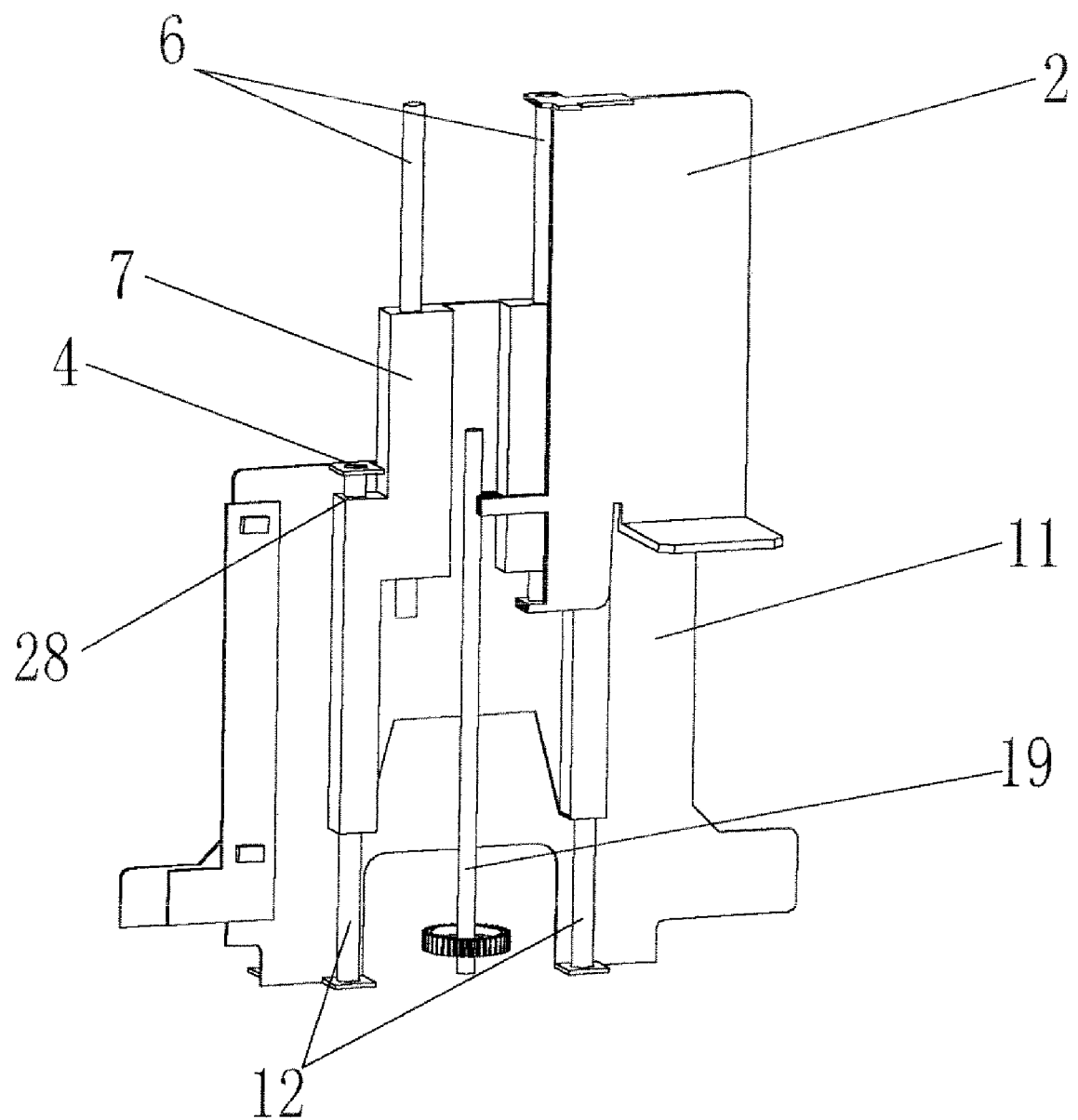
FIG. 4 is a sectional cutaway drawing of the vehicle-mounted display elevating device according to an embodiment of the present invention.
Figure 5:
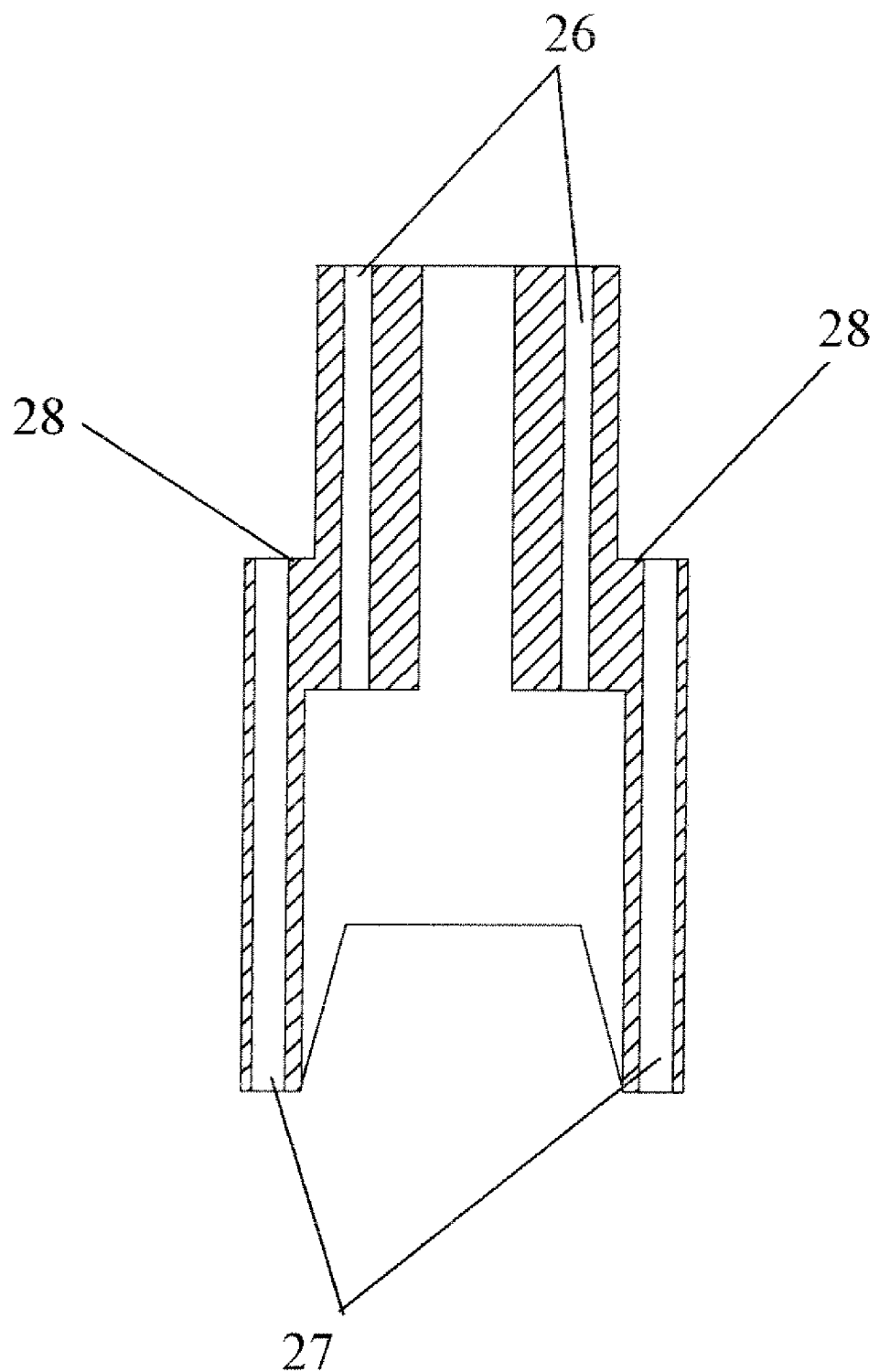
FIG. 5 is a cross-sectional view of the stop block of the vehicle-mounted display elevating device according to an embodiment of the present invention.
Figure 6:
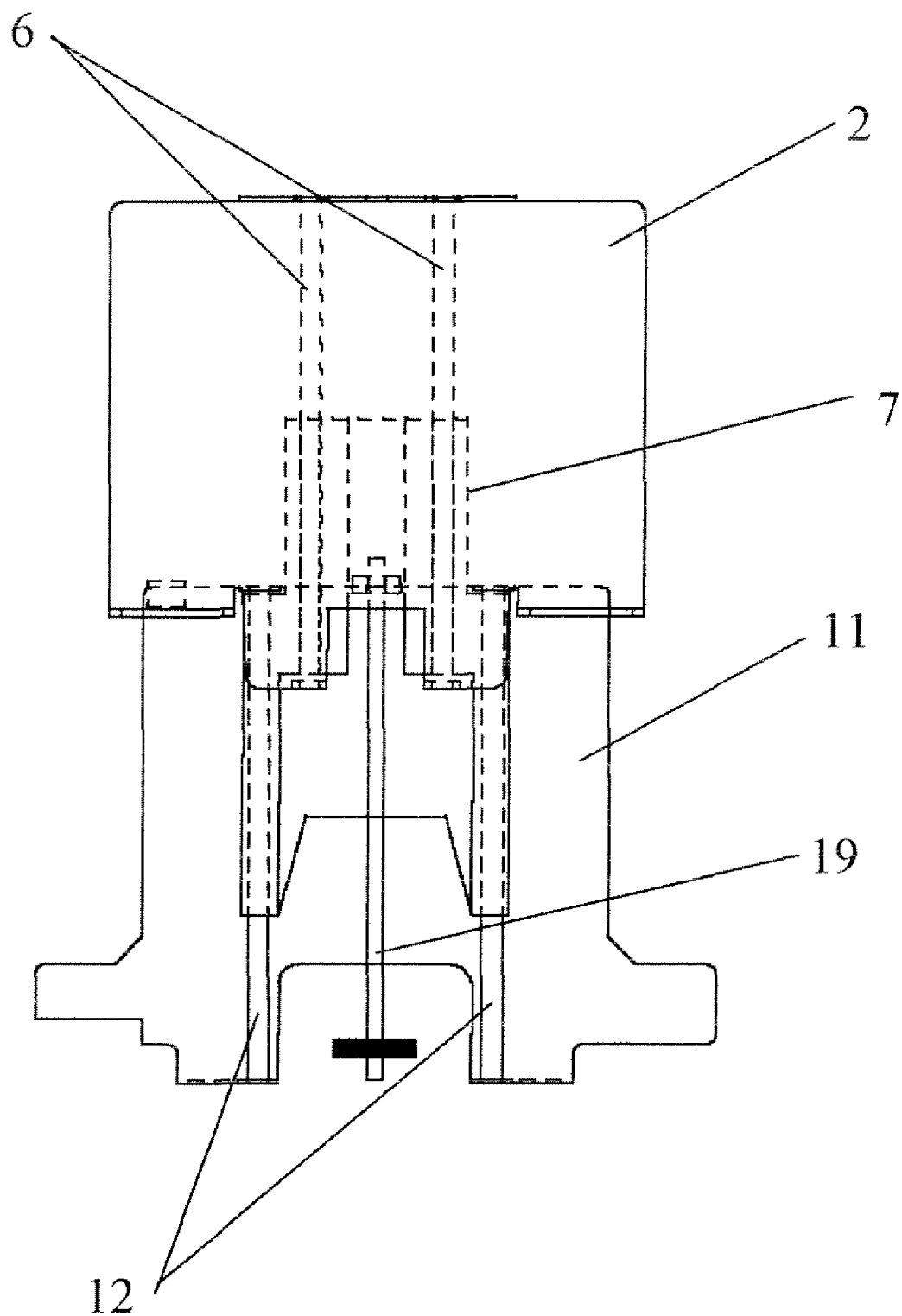
FIG. 6 is another schematic structural diagram of the vehicle-mounted display elevating device according to an embodiment of the present invention.

As shown in FIG. 4 and FIG. 5, the stop block 7 is a structure that is narrow in the upper part and wide in the lower part. Upper guide holes 26 matching with the upper guide bars 6 are arranged on both sides of the upper potion of the stop block 7, and the lower guide holes 27 matching with the lower guide bars 12 are arranged on both sides of the lower portion of the stop block 7. As shown in FIG. 6, the display rack 2 is connected with the guide bar carrier 11 by the stop block 7 that may move along the upper guide bars 6 and the lower guide bars 12 vertically. Steps 28 are formed as a stopper where the upper and lower parts of the stop block 7 join, such that the steps 28 work in cooperation with the fixing lugs 4 on the guide bar carrier 11 to limit the stop block 7 and in turn limit the position to which the display rack 2 moves up. The fixing lugs 4 may be arranged on any proper location of the guide bar carrier 11, preferably in this embodiment configured as the lower bar fixing lugs. Preferably, the two upper guide bars 6, two lower guide bars 12 and the screw rod 19 are horizontally aligned with each other, with the two upper guide bars 6 located between the two lower bars 12, and the screw 19 between the two upper guide bars 6 and the two lower guide bars 12.

In this embodiment, the threaded structure on the display rack 2 is preferably a threaded member 5 fixed thereon, such as a bolt. The threaded member 5 is engaged with the screw rod 19 to convert the rotation of the screw rod 19 to the translation movement of the display rack 2.

As shown in FIG. 2, the base support 18 is provided with a motor 13, which drives the screw rod 19 to rotate through a set of gear transmission pair. By means of the positive rotation and the counter-rotation of the motor 13, the threaded member 5 is driven and in turn the display rack 2 is driven to move up and down. The gear transmission pair comprises a gear set. The horizontal set motor 13 is engaged with the skew gear 15 via the runner 14, the skew gear 15 is engaged with the disk gear 16, which is finally engaged with the screw gear 17 that is fixed on the screw rod 19.

Figure 7:
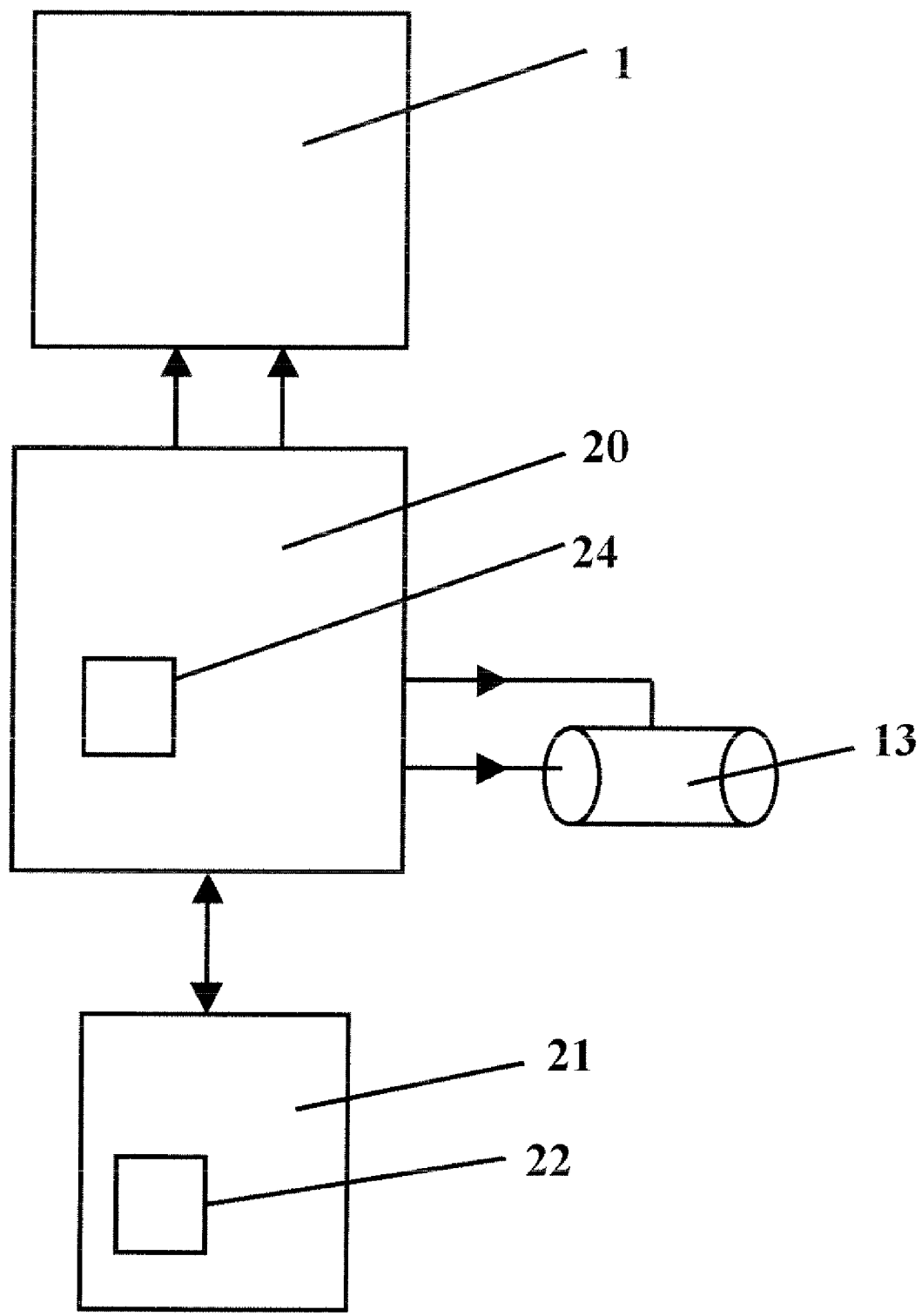
FIG. 7 is a block diagram of the control portion of the vehicle-mounted display elevating device according to an embodiment of the present invention.

As shown in FIG. 7, the display elevating device according to this embodiment further comprises a position sensor and a control module 20. The position sensor comprises a reflecting plate 23 arranged on the display rack 2 (see FIG. 2) and two reflective photoelectric sensors 22 (see FIG. 1), the two reflective photoelectric sensors 22 installed on the sensitive module 21, and the sensitive module 21 on the guide bar carrier 11, as shown in FIG. 3. The reflecting plate 23 is arranged at the lower part of the display rack 2, and the two reflective photoelectric sensors 22 are respectively arranged at the lower and upper parts of the sensitive module 21 that is installed on one side of the guide bar carrier 11, facing the display rack 2. The two locations where the reflecting plate 23 meets the two reflective photoelectric sensors respectively are defined as the predetermined highest position and the lowest position to which the display rack 2 is allowed to move.

The control module 20 installed in the base support 18 includes an electronic control unit (ECU) 24 and a photosensitive module 21. The reflective photoelectric sensor 22 in the photosensitive module 21 always senses the position of the reflecting plate 23 on the display rack 2. The display rack 2 moves up and down together with the display 1. The reflecting plate 23 on the display rack 2 has the effect of reflection. When it passes through the reflective photoelectric sensor 22, the output of the reflective photoelectric sensor 22 will be jumping. During the ascending and the descending processes of the display rack 2, when the predetermined time period for the motor protection elapses (i.e., the time period not more than it takes for the display rack 2 to move from the highest position down to the lowest position, or the time period not more than taken for the display rack 2 to move from the lowest position up to the highest position), the reflective photoelectric sensor 22 in the sensitive module 21 can not detect the reflecting plate 23 on the display rack 2, it will then report to the ECU 24 in the control module 20. The ECU 24 in the control module 20 will instruct the motor 13 to stop running, causing the display to stop moving up or down.

Upper guide bar fixing lugs 3 are arranged on the display rack 2, and lower guide bar fixing lugs 4 on the guide bar carrier 11. When the display rack 2 move down to the bottom together with the display 1, the lower end 9 of the stop block 7 contacts with the base support 18, at the same time, the upper end of the stop block 7 contacts with the upper guide bar fixing lugs 3 on the display rack 2, thereby stopping the display rack 2 from moving down. Meanwhile, the reflecting plate 23 on the display rack 2 will meet the reflective photoelectric sensor 22 on the upper part of the sensitive module 21, which then detects the output jumping of the reflective photoelectric sensor 22 and reports to the ECU 24 in the control module 20. The ECU 24 will instruct the motor 13 to stop running, thereby stopping the display from moving down.

When the display 1 ascends to the top, the position-limiting steps 28 on the stop block 7 will contact with the lower guide bar fixing lugs 4 on the guide bar carrier 11, thereby stopping the display rack 2 from moving up. Meanwhile, the reflecting plate 23 on the display rack 2 will meet the reflective photoelectric sensor 22 on the lower part of the sensitive module 21, which then detects the output jumping of the reflective photoelectric sensor 22 and reports the information to the ECU 24 in the control module 20. The ECU 24 instructs the motor 13 to stop running, thereby stopping the display from moving up.

Figure 8:
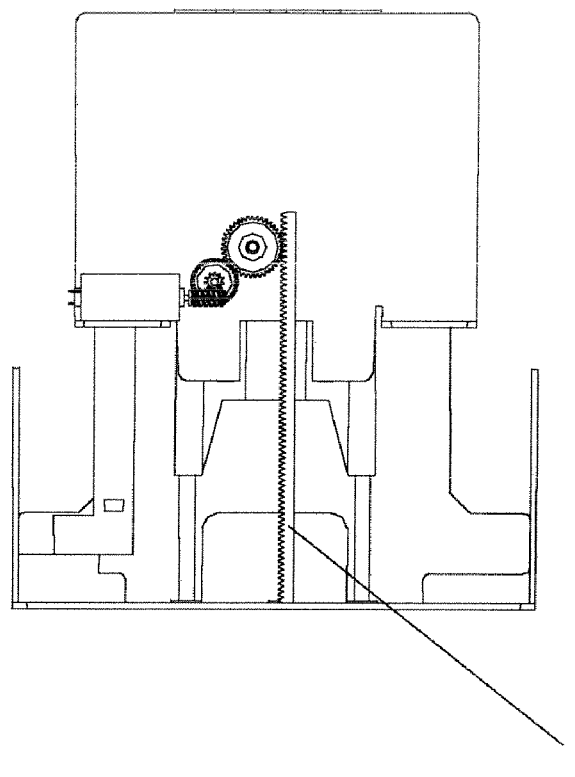
FIG. 8 is a schematic structural diagram of the vehicle-mounted display elevating device according to another embodiment of the present invention.
Figure 9:
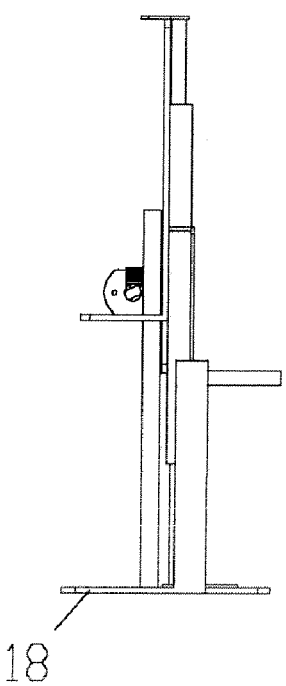
FIG. 9 is a side view of FIG. 8.

In addition to the screw rod and bolt mechanism, the display elevating device according to the embodiment of the invention may be realized in different ways. For example, it is feasible to use a gear rack and gear reciprocating motion mechanism or a belt and belt roller mechanism to replace the screw rod and bolt mechanism, to implement the elevation of the display rack 2 with the display 1. The specific embodiments are shown in FIG. 8 and FIG. 9, wherein the motor 13 is fixed on the display rack 2 to drive the gear, and the gear is engaged with the gear rack 25 fixed on the base support 18.

Some terms, as used herein, such as "up" and "down", "vertically" and "horizontally" etc. are illustrative only, and shall by no means be deemed as restrictive to the invention.

It is to be understood, however, that even though numerous characteristics and advantages of the present invention have been set forth in the foregoing embodiments, these embodiments are illustrative only, and modifications, amendments or substitutions may be made to the present invention, without departing from the spirit of the invention, and should be within the protected scope of the invention. In addition, the present invention is not only applicable to automobiles, but also to other vehicles.

PARTS LIST

1. Display
2. Display rack
3. Upper guide bar fixing lug
4. Lower guide bar fixing lug
5. threaded member
6. Upper guide bar
7. Stop block
8. Upper part of the stop block
9. Lower part of the stop block
10. Instrument panel
11. Guide bar carrier
12. Lower guide bar
13. Motor
14. Runner
15. Skew gear
16. Disk gear
17. Threaded gear
18. Base support
19. Screw rod
20. Control module
21. Photosensitive module
22. Reflective photoelectric sensor
23. Reflecting plate
24. Electronic control unit ECU
25. Gear rack
26. Upper guide hole
27. Lower guide hole
28. Stop step.

The invention claimed is:

1. A vehicle-mounted display elevating device, comprising:
    a display rack for mounting a display;
    an elevating mechanism operatively connected to the display rack, the elevating mechanism being adapted to extend and retract the display rack;
    a gear transmission pair for coupling an output shaft of a motor with the elevating mechanism;
    a guide bar carrier, one end of which being fixed on a base support, and on which being provided with at least one lower guide bar;
    at least one upper guide bar, disposed on the display rack; and
    a stop block, on which being provided with at least one lower guide hole and at least one upper guide hole that match respectively with the lower guide bar and the upper guide bar, enabling the stop block to move along the lower guide bar and the upper guide bar; the stop block further being provided with a stopper that works in cooperation with a fixing lug on the guide bar carrier to limit the stop block, thus limiting the elevating position of the display rack.

2. The vehicle-mounted display elevating device of claim 1, further comprising:
    a position sensor for sensing a predetermined highest position and a predetermined lowest position to which the display rack is allowed to move, and
    a control module for controlling the motor to stop rotating in response to the sensing result of the position sensor.

3. The vehicle-mounted display elevating device of claim 2, wherein:
    the position sensor comprises a reflecting plate on the display rack and two reflective photoelectric sensors, and wherein the positions where the reflecting plate respectively meets the two reflective photoelectric sensors are defined as the predetermined highest position and the lowest position to which the display rack is allowed to move.

4. The vehicle-mounted display elevating device of claim 3, wherein:
    the reflecting plate is provided at the lower part of the display rack, and the two reflective photoelectric sensors are respectively provided at the lower and upper parts on one side of the guide bar carrier, facing the display rack.

5. The vehicle-mounted display elevating device of claim 2, wherein:
    the control module is further configured to control the motor to stop rotating when the position sensor fails to detect any change in the position of the display rack in a predetermined time period during the ascending or descending process of the display.

6. The vehicle mounted display elevating device of claim 1, wherein the elevating mechanism comprises:
a threaded structure on the display rack; and
a screw rod engaged with the threaded structure, one end of the screw rod being located in a bearing disposed on a base support.

7. The vehicle-mounted display elevating device of claim 6, wherein:
the threaded structure is a threaded member that is fixed on the display rack.

8. The vehicle-mounted display elevating device of claim 7, wherein:
the threaded member is a bolt.

9. The vehicle-mounted display elevating device of claim 1, wherein:
the stopper on the stop block is a step arranged on the stop block, and the fixing lug on the guide bar carrier is a lower guide bar fixing lug arranged on the top of the guide bar carrier.

10. The vehicle-mounted display elevating device of claim 6, wherein:
the at least one lower guide bar is configured as a pair of parallel bars; the at least one upper guide bar is also configured as a pair of parallel bars; and both the at least one lower guide hole and the at least one upper guide hole provided on the stop block are correspondingly configured as a pair of parallel holes respectively.

11. The vehicle-mounted display elevating device of claim 10, wherein:
the two upper guide bars are arranged between the two lower guide bars, and the screw rod is arranged between the two upper guide bars and the two lower guide bars.

12. The vehicle-mounted display elevating device of claim 10, wherein:
the stop block is narrow in the upper part and wide in the lower part; the upper guide holes are located respectively at both sides of the upper part, the lower guide holes respectively at both sides the lower part; and a step is formed as the stopper where the upper part joins with the lower part.

13. The vehicle-mounted display elevating device of claim 1, wherein:
the stop block is located between the guide bar carrier and the display rack, and is used to connect the display rack with the guide bar carrier.

14. The vehicle-mounted display elevating device of claim 1, wherein:
the upper guide bar is located at one side of the display rack opposite to that on which the display is mounted.

15. The vehicle-mounted display elevating device of claim 1, wherein:
the stop block works in cooperation with the upper guide bar fixing lug provided on the display rack to limit the position to which the display rack is allowed to move down.

16. The vehicle-mounted display elevating device of claim 6, wherein:
the gear transmission pair includes a skew gear engaged with a runner on the motor output shaft, a disk gear engaged with the skew gear, and a screw gear fixed on the screw rod and engaged with the disk gear.

17. The vehicle-mounted display elevating device of claim 1, wherein:
the elevating mechanism comprises a gear rack and gear mechanism or a belt and belt roller mechanism.

* * * * *